United States Patent [19]
Nakano et al.

[11] Patent Number: 5,625,725
[45] Date of Patent: Apr. 29, 1997

[54] MAGNETO-OPTICAL PICKUP DEVICE HAVING PHASE COMPENSATING CIRCUITRY

[75] Inventors: Satoshi Nakano; Teiichi Miyauchi; Takeshi Yamasaki, all of Kanagawa; Satoshi Sasaki, Tokyo, all of Japan

[73] Assignee: Sony Corporation, Tokyo, Japan

[21] Appl. No.: 361,653

[22] Filed: Dec. 22, 1994

[30] Foreign Application Priority Data

Dec. 28, 1993 [JP] Japan .................................. 5-337673

[51] Int. Cl.[6] ............................. G02B 6/12; G11B 11/00
[52] U.S. Cl. .................................. 385/14; 385/8; 385/3; 385/2; 360/114; 369/13; 369/112
[58] Field of Search .............................. 369/13, 109, 112; 360/114; 365/122; 385/14, 8, 2, 3

[56] References Cited

U.S. PATENT DOCUMENTS

| | | | |
|---|---|---|---|
| 4,801,184 | 1/1989 | Revelli | 385/8 |
| 5,323,409 | 6/1994 | Laskoskie et al. | 372/32 |
| 5,442,719 | 8/1995 | Chang et al. | 385/3 |

*Primary Examiner*—David C. Nelms
*Assistant Examiner*—Andrew C. Tran
*Attorney, Agent, or Firm*—Hill, Steadman & Simpson

[57] ABSTRACT

Even when manufacturing of a waveguide is fluctuated and an optical parameter is fluctuated or a wavelength of emitted light is fluctuated, a phase difference between two intrinsic modes can be compensated (positive integral multiple of $\pi$). Thus, it is possible to prevent a reproduced signal from being deteriorated by elliptically polarized light. A magneto-optical reproducing pickup includes an optical waveguide (4) for guiding light reflected on a magneto-optical recording medium to a differential photo-detecting unit (9) side and phase compensating circuitry for compensating a phase difference between light components of a TE mode an a TM mode included in reflected light. In this case, the phase compensating circuitry comprises the optical waveguide (4) composed of a substrate formed of an electrooptic crystal and a thin film having a light refractive index higher than that of the substrate formed on the substrate, phase control electrodes (21a and 22b) for applying an electric field to the optical waveguide (4) in the direction along the TM mode and a feedback circuit (11).

23 Claims, 15 Drawing Sheets

MAGNETO-OPTICAL PICKUP DEVICE HAVING PHASE COMPENSATING CIRCUITRY

BACKGROUND OF THE INVENTION

The present invention relates to a magneto-optical reproducing optical pickup for reproducing an information signal recorded on a recording medium, such as a magneto-optical disc or the like and, more particularly, to a magneto-optical reproducing optical pickup using an optical waveguide.

FIG. 1 of the accompanying drawings shows an example of a magneto-optical reproducing pickup using individual parts. As shown in FIG. 1, straight line polarized light (simply referred hereinafter as "TE wave") having a predetermined polarizing plane emitted from a light source 101 composed of a laser light source formed of a laser diode and a polarizing plate is radiated through a partial beam splitter 102 (referred to hereinafter as "partial BS") on a recording medium, i.e., magneto-optical recording medium 103. Light reflected from the magneto-optical recording medium 103 is reflected by the partial BS102 to an analyzer (analyzed by 45degrees) 104 which in turn introduces that reflected light into a pair of photodetecting devices 105a, 105b. Thereafter, the reflected light is introduced into a differential amplifier 106 of the following stage as an electrical signal (photodetected output). The pair of photodetecting devices 105a, 105b and the differential amplifier 106 constitute a differential detecting circuit 107. In this case, the partial BS102 has a characteristic such that it can reflect 20% of TE wave, for example, and reflect substantially 100% of TM wave of a polarized plane perpendicular to the TE wave.

Most (80%) of the TE wave from the light source unit 101 is radiated on the magneto-optical recording medium 103. Although the reflected light whose polarizing plane is rotated by an optical-magnetic mutual action (Kerr effect) in response to a magnetization of a recorded signal on the magneto-optical recording medium 103 is again introduced into the partial BS102, almost all of the TE wave component generated by rotation (kerr rotation) based on Kerr effect is reflected.

The TE wave component reflected by the partial BS102 is polarized and analyzed by the next analyzer 104 at 45 degrees and introduced into the pair of photodetecting devices 105a, 105b. In this case, an amount of light incident on one photodetecting device 105a, for example, is decreased in response to recorded information on the magneto-optical recording medium 103, i.e., the magnitude of the Kerr rotation so that it is possible to generate a reproduced signal by differentially detecting the detected outputs of the two photodetecting devices 105a, 105b by the differential detecting circuit 107.

As a magneto-optical reproducing pickup which can be miniaturized, reduced in weight and satisfactorily mass-produced, there is known a magneto-optical reproducing pickup which uses an integrated optical technology utilizing an optical waveguide, i.e., magneto-optical reproducing pickup in which light emitted from an optical waveguide is directly radiated onto a magneto-optical recording medium and rotation of a polarizing plane of light passed through or reflected onto the magneto-optical recording medium (see Japanese laid-open patent publications Nos. 60-224139 and 1-279432).

As shown in FIG. 2, light L propagating through an optical waveguide 111 becomes elliptical polarized light because propagation constants between corresponding modes in the polarized directions perpendicular to each other are different.

When polarized light incident on the surface of a magneto-optical material becomes elliptical, information of rotation of a detected polarized plane becomes small. If the direction of polarized light incident on the optical waveguide is in agreement with one stationary mode, light can pass through one optical waveguide when such light is introduced under the condition that its polarized state is maintained. However, if reflected light from the surface of the magneto-optical material is again introduced into the optical waveguide, when such light is returned, another stationary mode component also is generated by the rotation of the polarized plane by the magneto-optical material. As a result, a phase difference between the two modes makes emitted light become elliptical polarized light.

Differential detection using polarizers whose polarizing directions are respectively inclined at ±45 degrees relative to the polarized direction of incident light will be described with reference to FIGS. 3 and 4. In the schematic diagrams shown in FIGS. 3 and 4, a vertical axis represents a TE mode polarizing wave direction and a horizontal axis represents a TM mode polarized wave direction. Then, FIGS. 3 and 4 show polarized directions (vectors) of two reflected lights, i.e., reflected light 121 in the upward magnetization and reflected light 122 in the downward direction, respectively.

In FIGS. 3 and 4, lines $m$ and $n$ extending in the directions of ±45° relative to the horizontal axis represent polarizing directions of two polarizers whose polarizing directions are inclined at +45° and −45° relative to the polarized direction of incident light 123. In this example, let it be assumed that light of TE mode is introduced into the magneto-optical recording medium.

Specifically, when a magnetization direction of the magneto-optical recording medium is inverted, the polarized directions of the two reflected lights 121 and 122 are rotated by Kerr effect by the +θ or −θ relative to the horizontal axis TM. At that time, the differential detector outputs a difference (=line AA'—line aa') or (line BB'—line bb') at peak-to-peak.

When these reflected lights 121, 122 propagate through optical wave guides and become elliptical polarized lights 124, 125 as shown in FIG. 4, a difference (=line AA'—line aa') between line AA'and line aa' connecting tops of long axes of respective ellipses and a difference (=line BB'—line bb') between line BB' and line bb' connecting tops of long axes of respective ellipses are reduced as compared with a difference (=line AA'—line aa') between line AA' and line aa' and a difference (=line BB'—line bb') between line BB' and line bb' shown in FIG. 3.

θ assumes a rotational angle of the polarizing plane in the magneto-optical material and ψ assumes a phase difference between two modes generated when light passes one of the optical wave guides. Then, when a differential detection is carried out on the polarized planes of the direction inclined ±45° from the incident light polarized directions, a detected signal is proportional to cosψsin2θ.

Thus, if the phase difference ψ is selected to be a positive integral of π, then no signal is deteriorated. In this case, the phase difference ψ, is in proportion to a waveguide length and there is a method of adjusting the phase difference on the basis of the waveguide length. According to this method, the waveguide must be manufactured with accuracy of wavelength order, which is not practical. Further, there is the problem that this method cannot cope with the change of optical parameters of waveguide due to the change of temperature and the change of polarized state of emitted light due to fluctuation of wavelength of light source.

SUMMARY OF THE INVENTION

In view of the aforesaid aspect, it is an object of the present invention to provide a magneto-optical reproducing pickup in which, even when manufacturing of a waveguide fluctuates and an optical parameter fluctuates or a wavelength of emitted light fluctuates due to a change of temperature, a phase difference between two intrinsic modes can be compensated (positive integral multiple of π) with ease and in which it is possible to prevent a reproduced signal from being deteriorated by elliptically polarized light.

According to an aspect of the present invention, there is provided a magneto-optical reproducing pickup which is comprised of an optical waveguide for guiding a first mode light component of light emitted from a light emitting device to a recording medium side and guiding light reflected on the recording medium to a photo-detector side, and a phase compensating circuit for disposed on the optical waveguide for compensating a phase difference between light components of the first and second modes.

DETAILED DESCRIPTION OF THE PREFERRED EMBODIMENTS

A magneto-optical reproducing pickup according to embodiments of the present invention will hereinafter be described with reference to FIGS. 5 to 18.

Figure 1:
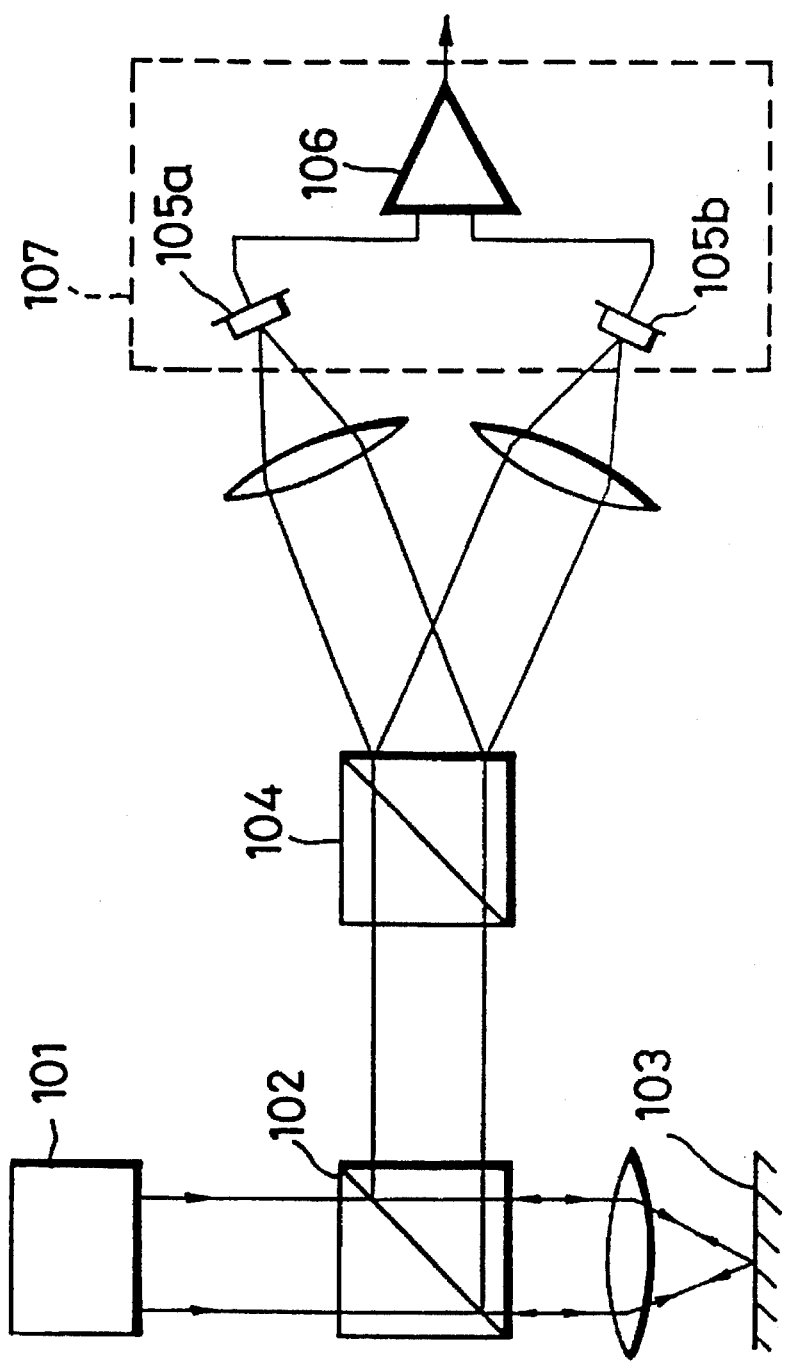
FIG. 1 is a schematic diagram showing an arrangement of a magneto-optical reproducing pickup.
Figure 2:
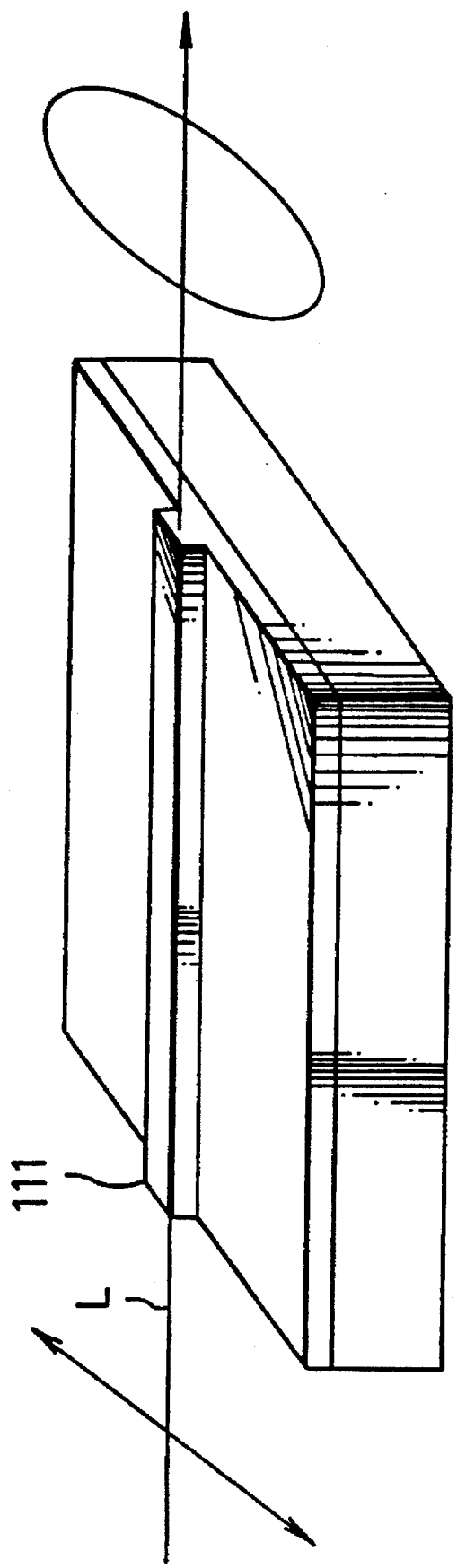
FIG. 2 is a schematic diagram used to explain elliptically polarized light of light emitted from an optical waveguide.
Figure 3:
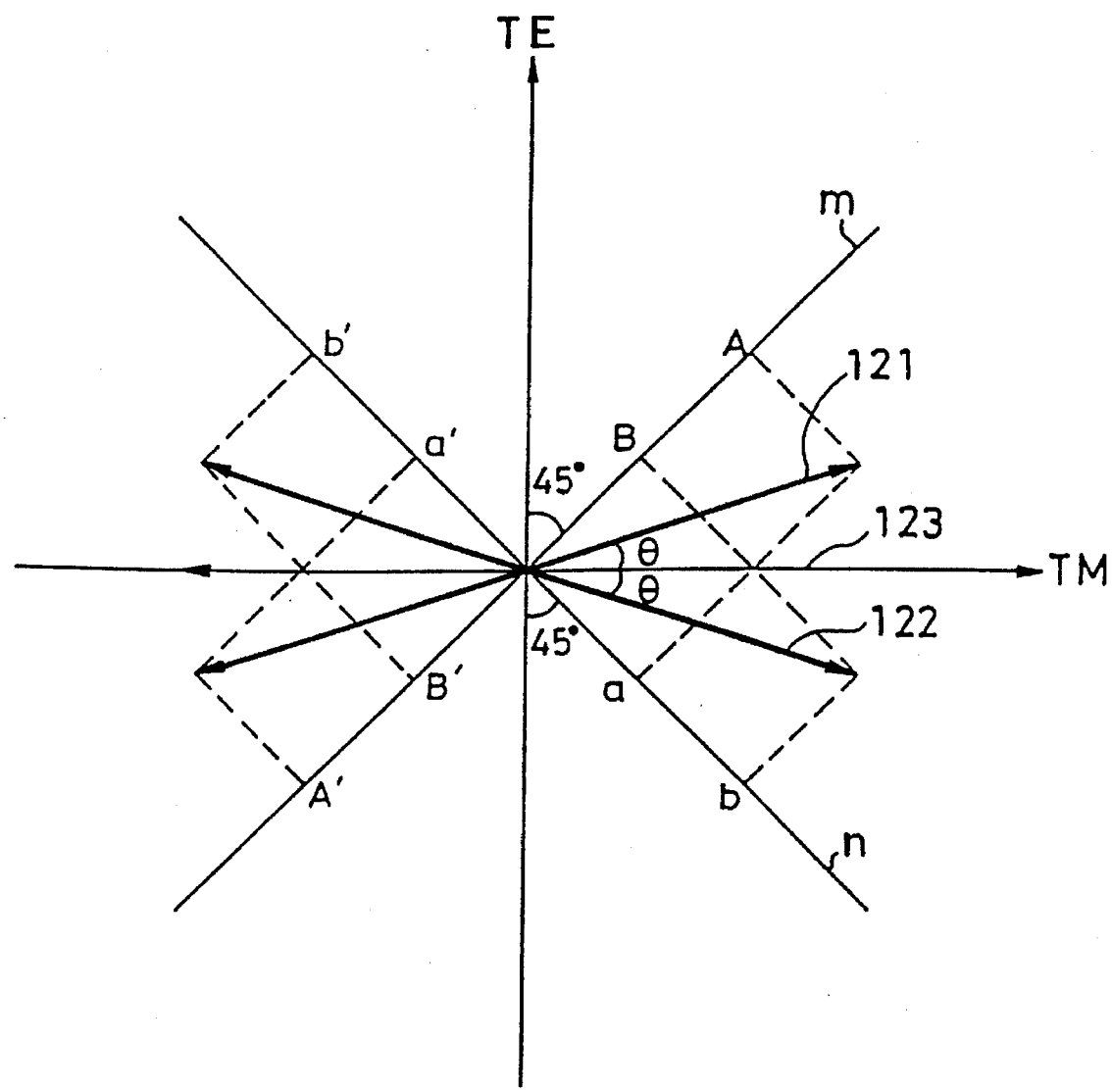
FIG. 3 is a vector diagram showing polarized light directions of reflected light in the upward magnetization and reflected light in the downward magnetization from a magneto-optical recording medium.
Figure 4:
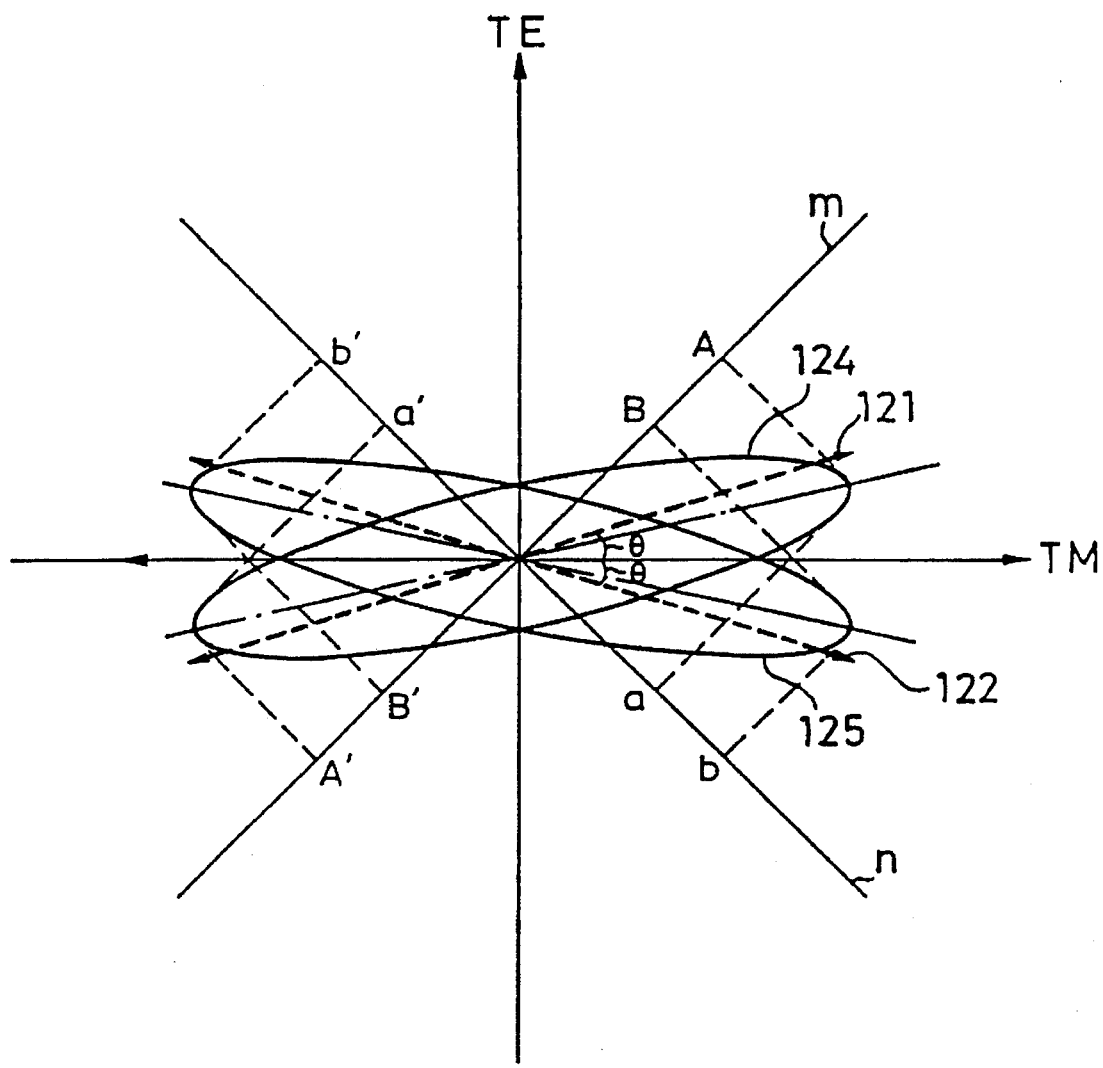
FIG. 4 is a vector diagram showing signal deterioration caused by elliptically polarized lights of two reflected lights.
Figure 5:
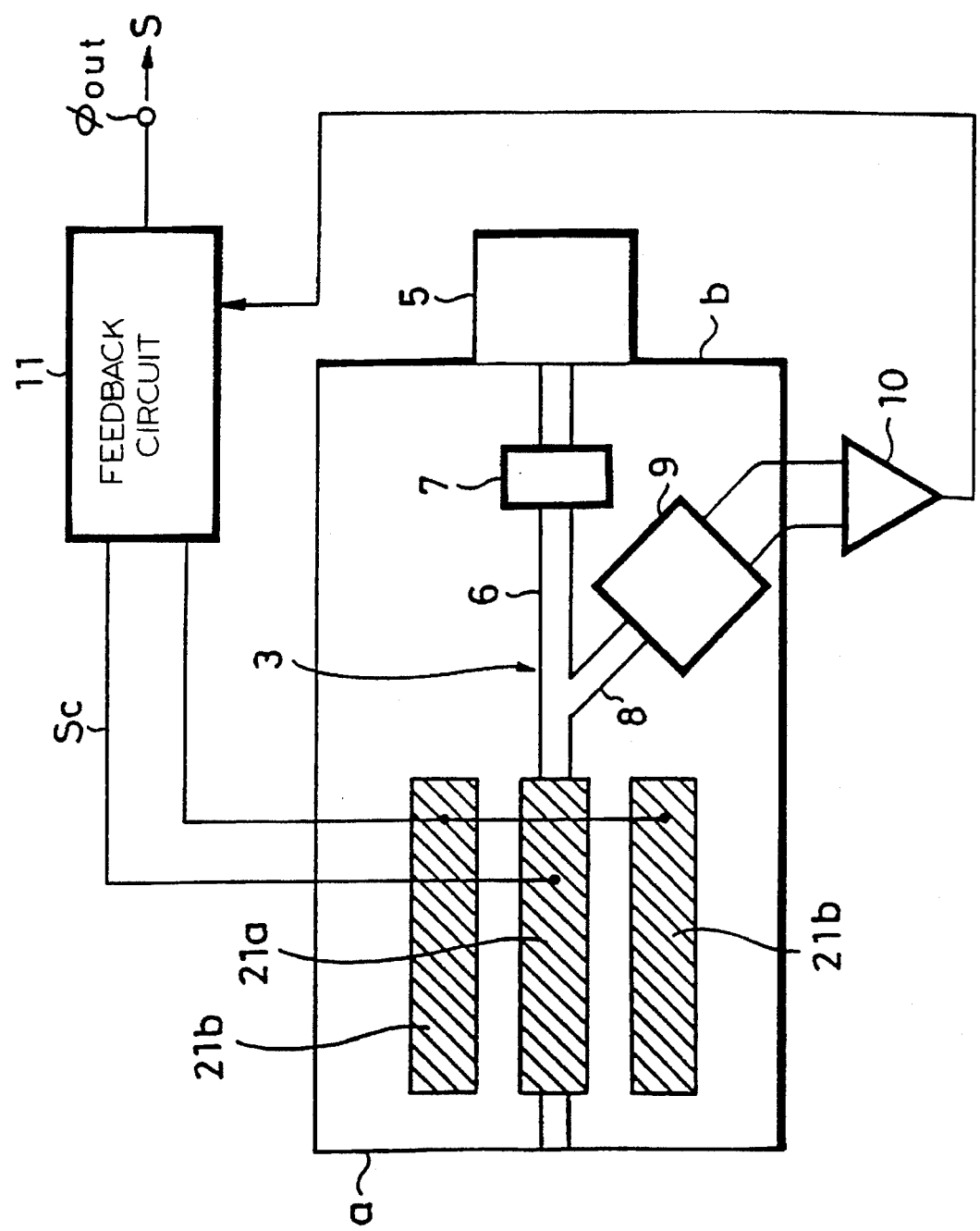
FIG. 5 is a schematic diagram showing an arrangement of a magneto-optical reproducing pickup according to a first embodiment of the present invention.
Figure 6:
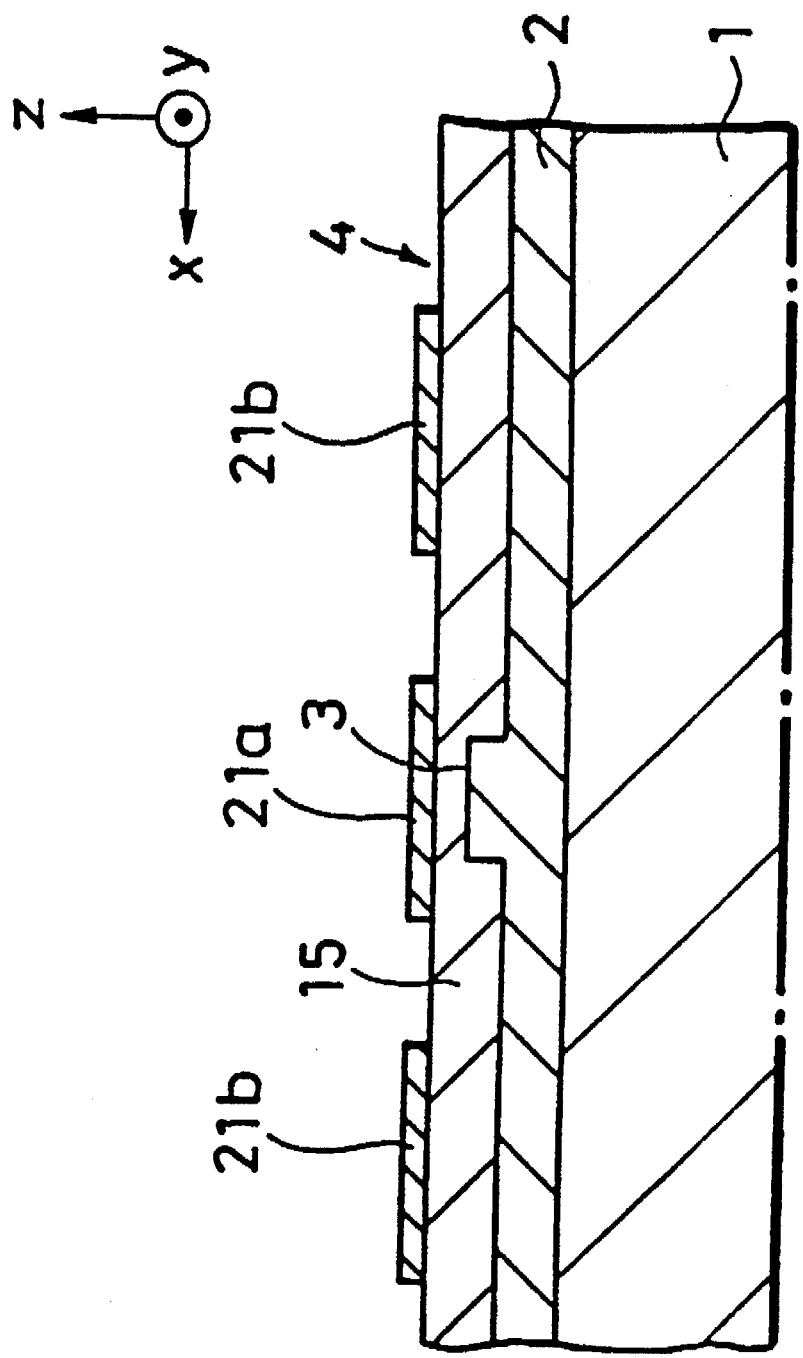
FIG. 6 is a cross-sectional view showing a main portion of the magneto-optical reproducing pickup according to the first embodiment of the present invention.
Figure 7:
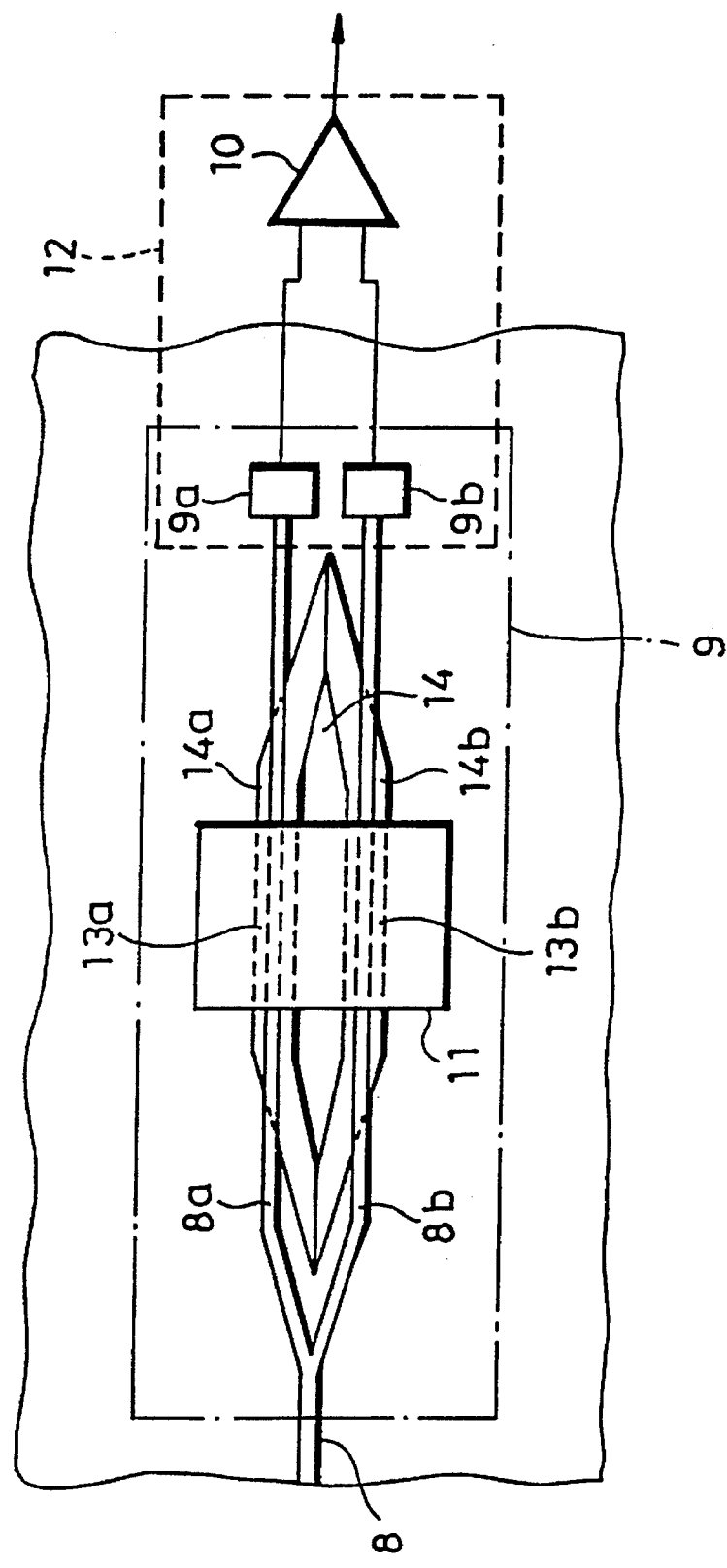
FIG. 7 is a schematic diagram showing an arrangement of a differential photo-detecting section.

As shown in FIGS. 5 and 6, a magneto-optical reproducing pickup according to a first embodiment of the present invention comprises a substrate 1 having a height of about 0.5 mm and made of an electrooptic crystal, e.g., KTP (z cut plate), a waveguide layer 2 having a film thickness of about 170 nm and made of a dielectric film having high refractive index, such as $TiO_2$ thin film formed on the substrate 1, and an optical waveguide 4 shaped as a so-called rib-type three-dimensional optical waveguide having a waveguide portion in the form of a convex-shaped line 3 (about 170 nm thick) along a predetermined waveguide and which waveguide portion is shaped as convex in cross section by selectively etching the waveguide layer 2 by 20 nm according to ion milling.

At an end face b of the optical waveguide 4 opposite a face (simply referred to as "opposing face") is disposed a light source, e.g., semiconductor laser (laser diode) 5. This semiconductor laser 5 is connected at its active layer to optical path of the optical waveguide 4 and thereby is optically connected to the optical waveguide 4. The optical waveguide 4 has a mode filter 7 disposed in the portion 3, such filter 7 serving as a polarizer to obtain a linearly polarized light (TE wave) having a predetermined polarized plane.

The convex-shaped line 3 of the optical waveguide 4 effectively confines laser light emitted from the semiconductor laser 5 and light (generally referred to as a waveguide light) reflected on the magneto-optical recording medium so that waveguide light may effectively be transmitted along the optical waveguide 4. According to the first embodiment of the present invention, the film thickness of the waveguide layer 2 and the width and height of the convex-shaped line 3 are selected so as to minimize the beam width of waveguide light in the film thickness direction and to satisfy single mode conditions. When a wavelength λ of laser light emitted from the semiconductor laser 5 is 632.8 nm, for example, it is possible to realize a beam width of 210 nm in the film thickness direction by selecting the height and width of the convex-shaped line 3 to be 170 nm and 2 μm with respect to the TM0 mode.

As illustrated, the optical waveguide 4 is diverges somewhere along the optical path 6 like substantially Y-shape. The diverged portion of the optical path 6 is a portion through which light reflected from the magneto-optical recording medium is transmitted and provides a returning path 8 for the optical waveguide 4. Therefore, the diverged portion will hereinafter sometimes be referred to as "returning path 8".

A differential photo-detecting unit 9 is disposed somewhere near the end of the optical path 8. As shown in FIG.

7, the differential photo-detecting unit 9 comprises two diverged paths 8a, 8b each diverged from the optical path 8 and first and second photo-detecting elements 9a, 9b formed of photo-diodes optically coupled to tip ends of these diverged paths 8a, 8b to photoelectrically convert reflected lights from the diverged paths 8a, 8b. Output terminals of these photo-detecting elements 9a, 9b are connected to a differential amplifier 10 disposed outside. The differential amplifier 10 is a circuit for differentially amplifying detected signals supplied thereto from the first and second photo-detecting elements 9a, 9b. Information signals recorded on the magneto-optical recording medium are output from the output terminal of the differential amplifier 10. In this embodiment, a reproduced output S is output from an output terminal of a feedback circuit 11 described below. The first and second photodetecting elements 9a, 9b and the differential amplifier 10 constitute a differential amplifying circuit 12.

The diverged paths 8a, 8b in the differential photodetecting unit 9 include first and second signal detecting mode filters 13a, 13b disposed thereon. The first and second signal detecting mode filters 13a, 13b include polarizing planes with inclinations ideally of +45° and −45° with respect to the TE mode, for example.

The first and second signal detecting mode filters 13a, 13b include a groove 14 having side surfaces 14a, 14b with predetermined angles. The diverged paths 8a, 8b are provided through the side surfaces 14a, 14b, and a cladding mode filter, for example, can be constructed on the side surfaces 14a, 14b at their portions through which the diverged paths 8a, 8b are provided. The groove 14 having the side surfaces 14a, 14b of the predetermined angles can be formed by selecting the crystal surface of the substrate 1 and etching the substrate 1 in a crystal anisotropy fashion. Then, by forming the $TiO_2$ film 2 constructing the rib-type optical waveguide on the substrate 1 after etching, it is possible to construct the convex-shaped line 3, i.e., the diverged paths 8a, 8b so that the diverged paths 8a, 8b can extend through the side surfaces 14a, 14b of the groove 14 when the groove 14 is formed.

Laser light emitted from the semiconductor laser 5 is introduced into the convex-shaped line 3 on the optical path 6 of the optical waveguide 4 and guided by the convex-shaped line 3 toward the opposing surface a. At that time, the laser light is converted by the mode filter 7 formed somewhere on the optical path 6 to linearly polarize the light (TE wave) of the predetermined polarizing plane and introduced into the opposing surface a. The laser light introduced into the opposing surface a side is directly irradiated on a magneto-optical recording medium (not shown) and the polarizing plane is rotated by photo-magnetic mutual action corresponding to magnetization information recorded on the magneto-optical recording medium. Then, the laser light is again introduced into the convex-shaped line 3 of the optical waveguide 4 as reflected light.

The reflected light becomes light in which the TE mode light component and the TM mode light component are mixed because the polarizing plane is rotated by the photo-magnetic mutual action corresponding to the magnetization of the magneto-optical recording medium.

The reflected light is introduced into the signal detecting mode filters 13a, 13b of the differential photo-detecting unit 9, in which it is separated to a polarized component of +45° and a polarized component of −45° and introduced into the corresponding photo-detecting elements 9a, 9b.

When the magnetization information recorded on the magneto-optical recording medium is the upward magnetization, for example, and the polarized plane of the reflected light is rotated by +θ relative to the TE mode, a light component passed the first signal detecting mode filter 13a becomes large in light amount as compared with the light component passed the second signal detecting mode filter 13b. Concurrently therewith, the signal level of the detected signal output from the first photo-detecting element 9a becomes higher than that of the detected signal output from the second photo-detecting element 9b. Thus, the differential amplifier 10 outputs an output signal having a positive amplitude, for example.

When the magnetization information recorded on the magneto-optical recording medium is the downward magnetization and the polarized plane of the reflected light is rotated by −θ relative to the TE mode, the light component passed the first signal detecting mode filter 13a becomes small in light amount as compared with the light component passed the second signal detecting mode filter 13b. Concurrently therewith, the signal level of the detected signal output from the first photo-detecting element 9a becomes lower than that of the detected signal output from the second photo-detecting element 9b. Thus, the differential amplifier 10 outputs an output signal having a negative amplitude, for example.

The magnetization information recorded on the magneto-optical recording medium can be converted to logical information in response to the polarity of the output signal output from the differential amplifier 10 such that, when the polarity of the output signal is positive, the magnetization information becomes logic "0" and that, when the polarity of the output signal is negative, the magnetization information becomes logic "1".

The magneto-optical reproducing pickup according to the first embodiment of the present invention comprises, as shown in FIGS. 5 and 6, the waveguide layer 2 having the convex-shaped line 3 forming the rib-type waveguide 4, a planar film 15 made of an $SiO_2$ film formed on the waveguide layer 2 and an Al electrode film (referred to hereinafter as "plus electrode film") forming a plus electrode 21a and two Al electrode films (referred to hereinafter as "minus electrode films") forming a minus electrodes 21b, each formed on the planar film 15.

The plus electrode 21a is formed on the optical path 6 of the optical waveguide 4 at its portion just above the convex-shaped line 3 between the Y-shaped diverged point and the opposing surface a. The two minus electrodes 21b are formed on respective side portions of the plus electrode 21a at a predetermined distance from the plus electrode 21a. In this embodiment, a distance from the side end of the plus electrode 21a to the side end of the minus electrode 21b is set to several micrometers. The plus electrode 21a and the minus electrodes 21b constitute a phase control electrode unit 21.

In the first embodiment of the present invention, when the feedback circuit 11 is connected between the phase control electrode unit 21 and the differential amplifier 10, an electric field in the film thickness direction (z direction) is applied to the convex-shaped line 3 of the optical waveguide 4. An arrangement of the feedback circuit 11 will be described later on. The z direction is the same direction of the TM mode included in the reflected light.

When the electric field is applied to the z direction, a z direction of light refractive index in the substrate 1 formed on the electro-optic crystal (KTP) is changed due to Pockel's effect so that a propagation constant of the TM mode is changed in correspondence therewith. Thus, it is possible to control a phase difference between a light component of the TE mode and a light component of the TM mode included in the reflected light based on a control signal Sc from the feedback circuit 11.

An arrangement of the magneto-optical reproducing pickup according to the first embodiment will be described with reference to specific numerical values.

In the magneto-optical reproducing pickup according to the first embodiment of the present invention, as the substrate 1 there is used a substrate made of KTP having a Pockel's constant γ33 of 36.3 pm/V and having a light refractive index (n4Te) of horizontal direction, i.e., x direction of 1.7627 and a light refractive index of z direction of 1.8656. After the $TiO_2$ thin film 2 having a light refractive index nl=2.5000 was formed on the substrate 1, the convex-shaped line 3 having a height of 170 nm is formed to be the optical waveguide 4 by selective ion milling. The $SiO_2$ film 15 having a light refractive index n2=1.4500 is formed on the $TiO_2$ film 2. Further, the plus electrode 21a and the minus electrodes 21b made of Al electrode films are formed on the $SiO_2$ film 15 at its predetermined positions, thereby the magneto-optical reproducing pickup according to the first embodiment being formed. At that time, the lengths of the plus electrode 21a and the minus electrodes 21b in the longitudinal direction are both set to 10 mm.

Figure 8:
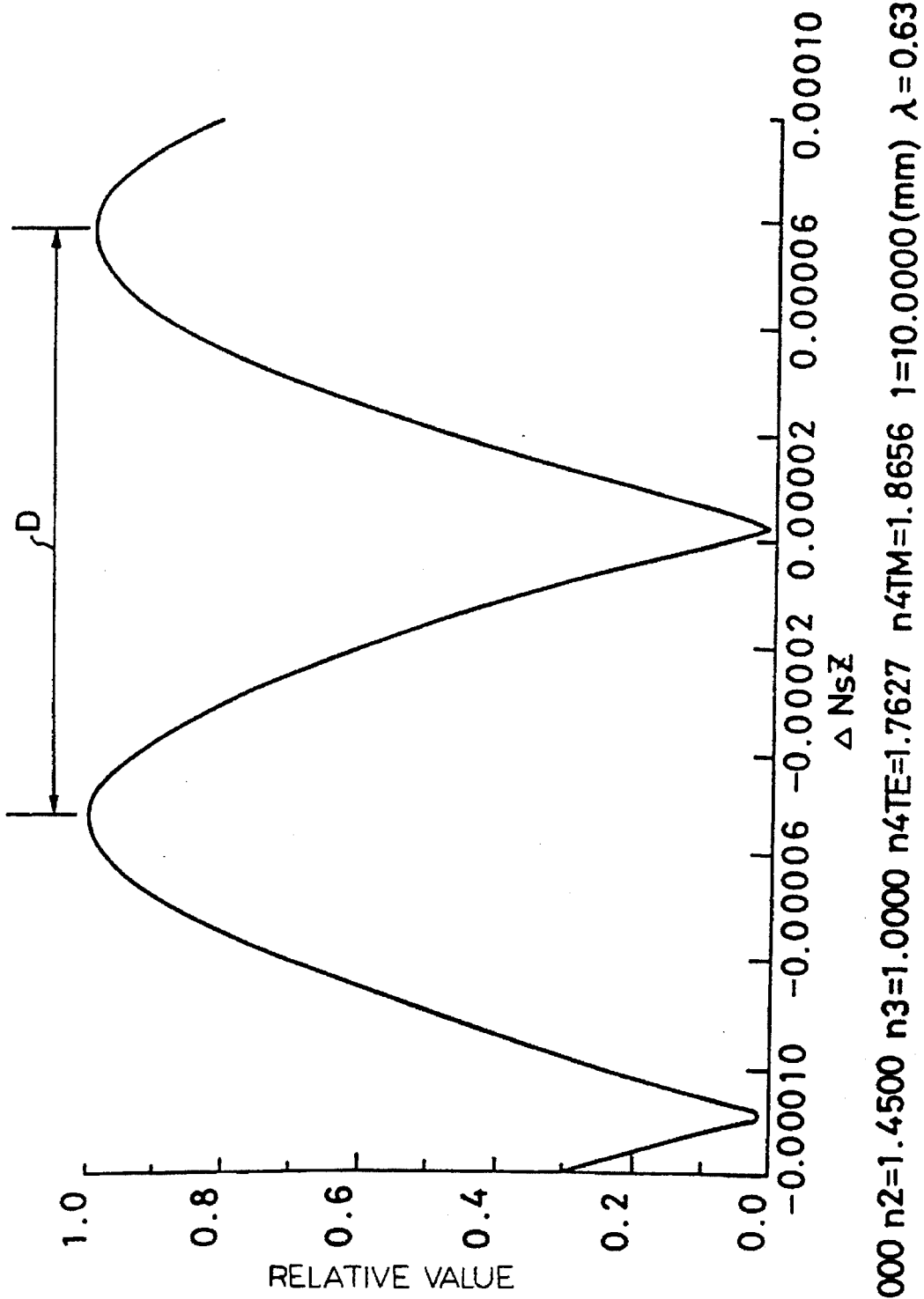
FIG. 8 is a characteristic graph showing measured results of dependence of the change of refractive index of a substrate (z direction) in relative values of photo-detected signals from two photo-detecting elements.

Having examined changes of relative values of detected signals output from the respective photo-detecting elements 9a, 9b when the light refractive index of the z direction of the substrate 1 is changed by changing a voltage applied to the phase control electrode unit 21 formed of the plus electrode 21a and the minus electrode 21b, as shown in FIG. 8, it is to be noted that a changing width D of the light refractive index in the z direction in which the relative value becomes maximum becomes about $10^{-4}$. In the illustrated example, the relative value becomes maximum when a changed amount ΔNsZ of the light refractive index in the z direction is near about −0.00008 and +0.00008. In FIG. 8, reference symbol n3 depicts a light refractive index of air and λ depicts a wavelength of laser light emitted from a light source.

In the first embodiment, when an electric field of 0.85V/μm in the z direction is applied to the optical waveguide 4 by supplying the control signal Sc from the feedback circuit 11 to the phase control electrode 21, the changed amount ΔNs of the light refractive index in the z direction becomes 0.00009 and the maximum relative value can be obtained.

An arrangement of the feedback circuit 11 will be described with reference to FIG. 9. The feedback circuit 11 can compensate a phase by using an error signal Se representing a displacement from a voltage applied to the phase control electrode 21 so that the relative value becomes maximum.

Specifically, the feedback circuit 11 synchronize-detects the output from the differential amplifier 10 by a frequency fm sufficiently higher than a frequency fc of a carrier signal read out from the magneto-optical recording medium to derive the error signal Se and feed this error signal Se back to the phase control electrode unit 21.

Figure 9:
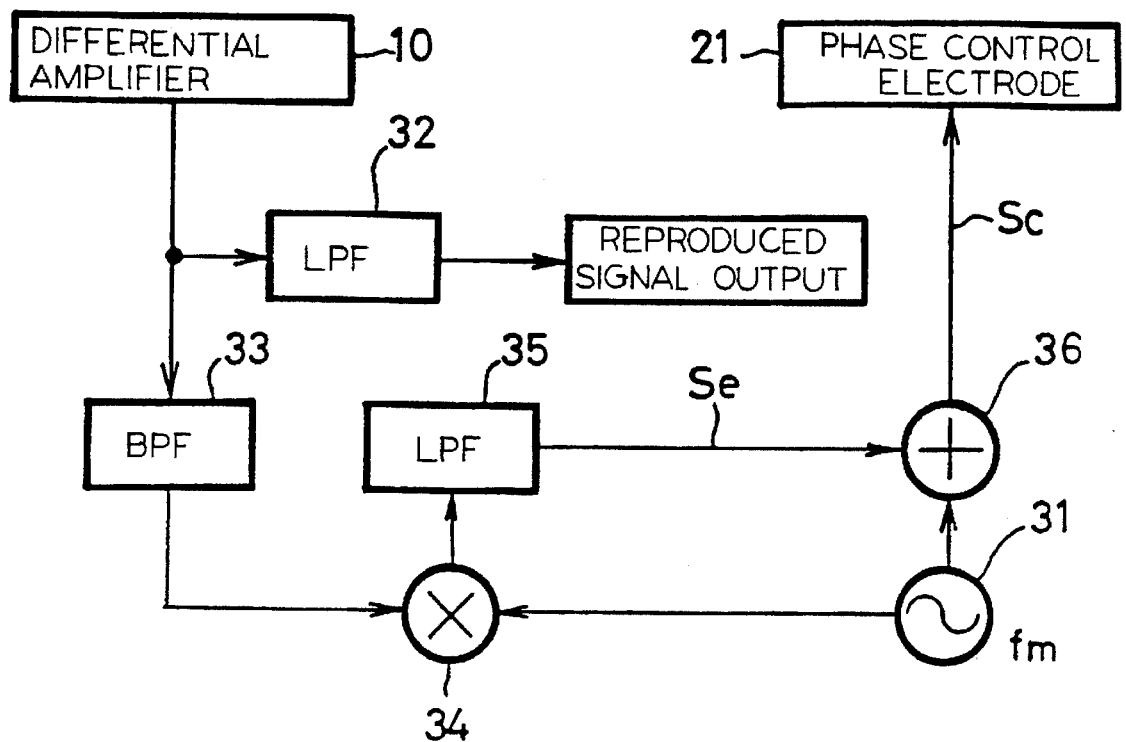
FIG. 9 is a block diagram showing an arrangement of a feedback circuit connected to the magneto-optical reproducing pickup according to the first embodiment.

As shown in FIG. 9, the feedback circuit 11 comprises an oscillator 31 for outputting a modulated signal with the frequency fm, a first low-pass filter (referred to hereinafter as "LPF") 32, a bandpass filter (referred to hereinafter as "BPF") 33 having a center frequency fm to eliminate a higher harmonic component having a frequency fm from the output of the differential amplifier 10, a multiplier 34 for multiplying the modulated signal from the oscillator 31 and the output signal of the BPF 33, a second low-pass filter (LPF) 35 for outputting the error signal Se from a multiplied signal supplied thereto from the multiplier 34 and an adder 36 for adding the error signal Se from the second LPF 35 and the modulated signal from the oscillator 31 to generate the control signal Sc.

Signal processing in the feedback circuit 11 will be described below. Initially, the modulating signal having the frequency fm is supplied from the oscillator 31 to the phase control electrode 21, whereby the output of the differential amplifier 11 is modulated by the frequency fm. Then, after the output of the differential amplifier 10 is supplied to the BPF 33, in which the higher harmonic component with the frequency fm thereof is eliminated, the resultant output is multiplied with the modulated signal from the oscillator 31 by the multiplier 34 and then processed by the second LPF 35 to provide the error signal Se.

This error signal Se is added to the modulated signal from the oscillator 31 by the adder 36 and the result is fed to the phase control electrode 21 as the control signal Sc. On the other hand, the output of the differential amplifier 10 is eliminated in modulated signal component with the frequency fm by the first LPF 32 and output as a reproduced signal.

As described above, in the magneto-optical reproducing pickup according to the first embodiment, the phase control electrode 21 formed of the plus electrode unit 21a and the minus electrodes 21b is formed through the planar film 15 made of the $SiO_2$ film on the optical waveguide 4 formed by the $TiO_2$ film 2 having the light refractive index higher than that of the substrate 1 is formed on the substrate 1 made of the electrooptical crystal KTP. Also, the electric field is applied to the optical waveguide 4 in the direction (z direction) along the TM mode by supplying the control signal Sc to the phase control electrode unit 21. Thus, with the application of the electric field, i.e., owing to the Pockel's effect, the light refractive index of the substrate 1 in the z direction is changed.

Therefore, the propagation constant of the TM mode is changed and the phase difference between the TE mode and the TM mode is changed. Accordingly, it is possible to control the phase difference between the TE mode and the TM mode based on the control signal Sc supplied from the feedback circuit 11. Thus, it becomes possible to adjust the phase difference to be a positive integral of π. As a result, the relative value of the detected signals output from the respective photo-detecting elements 9a, 9b is obtained and it is possible to prevent a reproduced signal from being deteriorated by the elliptically polarized light.

Figure 10:
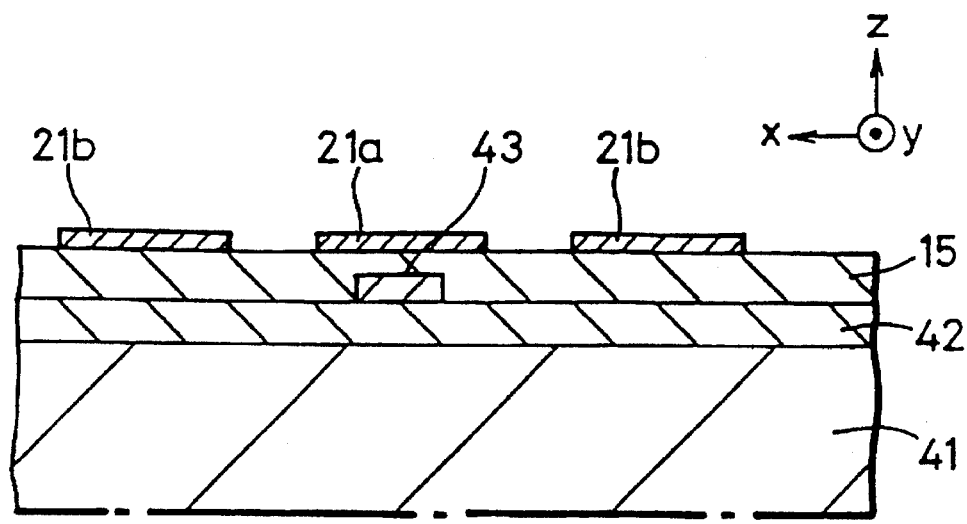
FIG. 10 is a cross-sectional view of a main portion of a magneto-optical reproducing pickup according to a modified example of the first embodiment of the present invention.

A modified example of the first embodiment will be described with reference to FIG. 10. Although the magneto-optical reproducing pickup according to the modified example has substantially the same arrangement as that of the magneto-optical reproducing pickup according to the first embodiment of the present invention, as shown in FIG. 10, the magneto-optical reproducing pickup according to the modified example differs from the magneto-optical reproducing pickup according to the first embodiment in that the substrate is not formed of the electro-optical crystal but is formed of a silicon substrate 41, for example, and that the optical waveguide 4 is formed by forming an electro-optical crystal, e.g., LN film ($LiNbO_3$) 43 on the silicon substrate 41 through an oxide film 42 in a line shape (precisely, a line shape having an Y-shaped diverging portion) by sputtering. The oxide film 42 can be formed by thermally oxidizing the silicon substrate 41.

The plus electrode 21a and the minus electrodes 21b are formed on the optical waveguide 4 at its positions where they are formed according to the first embodiment through the planar film 15 made of the SiO₂ film formed on the LN film 43.

Also in the magneto-optical reproducing pickup according to the modified example, similarly to the first embodiment, the electric field is applied to the optical waveguide 4 in the direction (z direction) along the TM mode by supplying the control signal Sc to the phase control electrode 21 formed of the plus electrode 21a and the minus electrodes 21b from the feedback circuit 11, whereby the light refractive index of the optical waveguide 4 in the z direction is changed owing to the so-called Pockel's effect.

Thus, the propagation constant of the TM mode is changed and the phase difference between the TE mode and the TM mode is changed. Accordingly, it is possible to control the phase difference between the TE mode and the TM mode based on the control signal Sc from the feedback circuit 11. Thus, it is possible to adjust the phase difference to be the positive integral multiple of $\pi$. As a result, the relative values of the detected signals output from the photo-detecting elements 9a and 9b can be maximized and it is possible to prevent the reproduced signal from being deteriorated due to the elliptically polarized light.

The magneto-optical reproducing pickup according to a second embodiment of the present invention will be described with reference to FIGS. 11 to 14. In FIGS. 11 to 14, like parts corresponding to those of FIGS. 5 and 6 are marked with the same references and therefore need not be described in detail.

Figure 11:
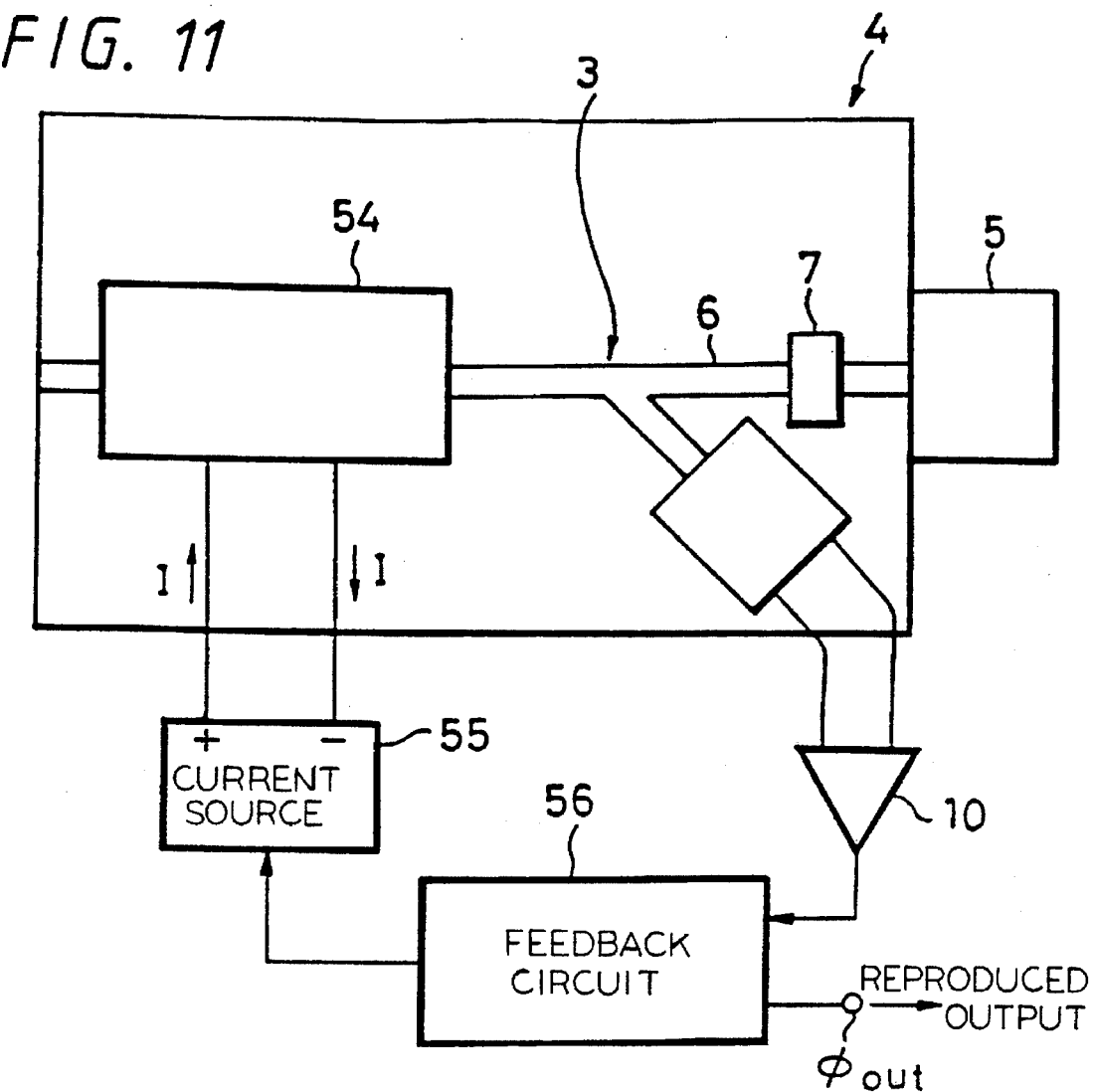
FIG. 11 is a schematic block diagram showing an arrangement of a magneto-optical reproducing pickup according to a second embodiment of the present invention.
Figure 12:
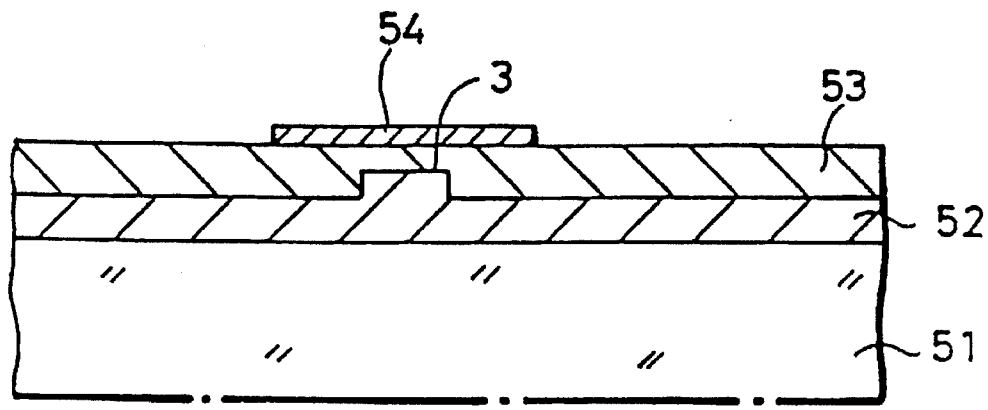
FIG. 12 is a cross-sectional view showing a main portion of the magneto-optical reproducing pickup according to the second embodiment of the present invention.
Figure 13:
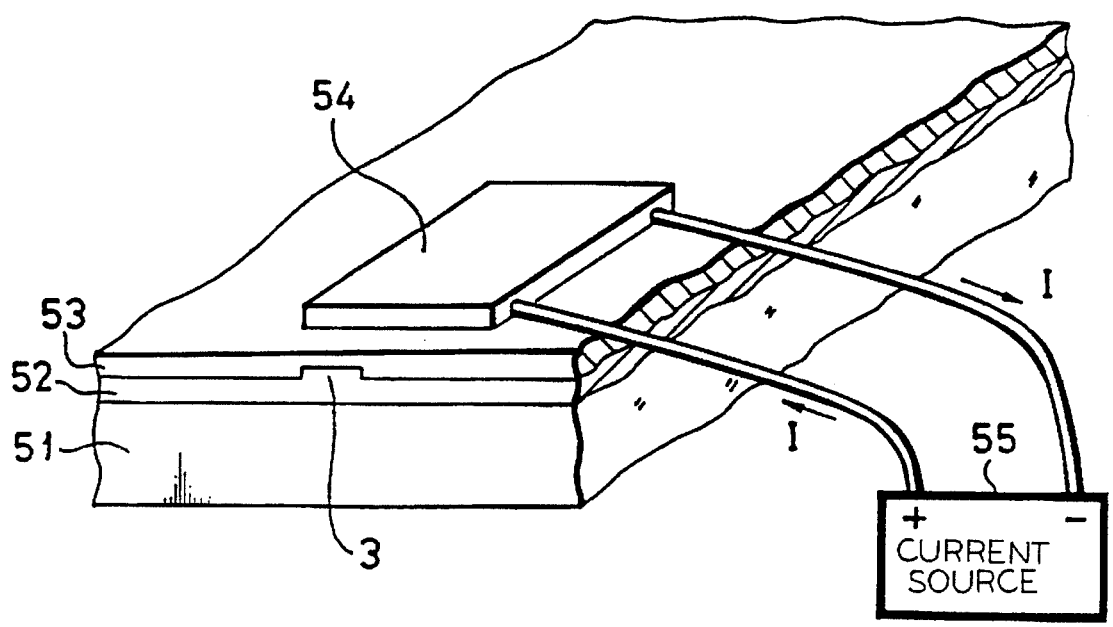
FIG. 13 is a perspective view showing a main portion of the magneto-optical reproducing pickup according to the second embodiment of the present invention.

As shown in FIGS. 11 to 13, the magneto-optical reproducing pickup according to the second embodiment has substantially the same arrangement as the magneto-optical reproducing pickup according to the first embodiment, but differs from the magneto-optical reproducing pickup according to the first embodiment as follows:

The substrate is formed of a glass substrate 51 having a height of 0.5 mm and a light refractive index=1.45; the thin film forming the waveguide layer and the convex-shaped line 3 is formed of a Ta₂O₅ thin film 52 having a light refractive index=2.05; the planar film is formed of an SiO₂ film 53 having a light refractive index=1.46; and a Peltier element 54 serving as a temperature control element is formed in the optical path 6 of the optical waveguide 4 at a portion just above the convex-shaped line 3 between the Y-shaped diverging point and the opposing face.

The temperature of the optical waveguide 4 under the Peltier element 54 can be controlled by the Peltier element 54. Study of experimental results shows that, when the length of the Peltier element 54 in the longitudinal direction was 10 nm, the phase difference between the TE mode and the TM mode can be changed by $\pi$ while the temperature was changed from 10° C. to 30° C.

The Peltier element 54 according to the second embodiment of the present invention is connected with a current source 55 through interconnections. Between the current source 55 and the differential amplifier 10 is connected a feedback circuit 56 which carries out feedback control such that a value of current I supplied from the current source supply 55 to the Peltier element 54 is held constant, i.e., the relative values of the detected signals from the first and second photo-detecting elements 9a and 9b are maximized.

Figure 14:
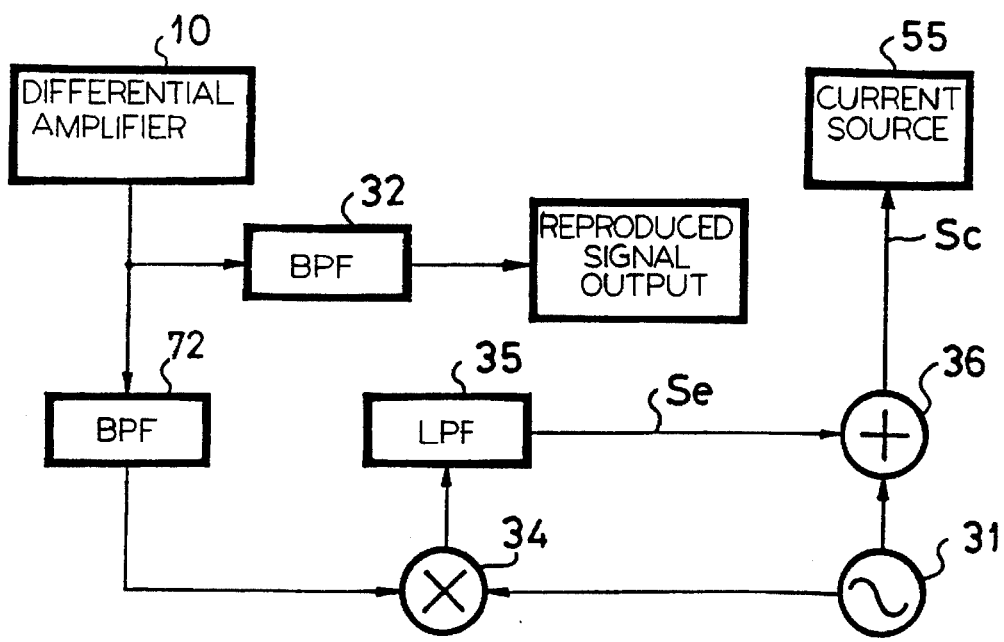
FIG. 14 is a block diagram showing an arrangement of a feedback circuit connected to the magneto-optical reproducing pickup according to the second embodiment of the present invention.
Figure 15:
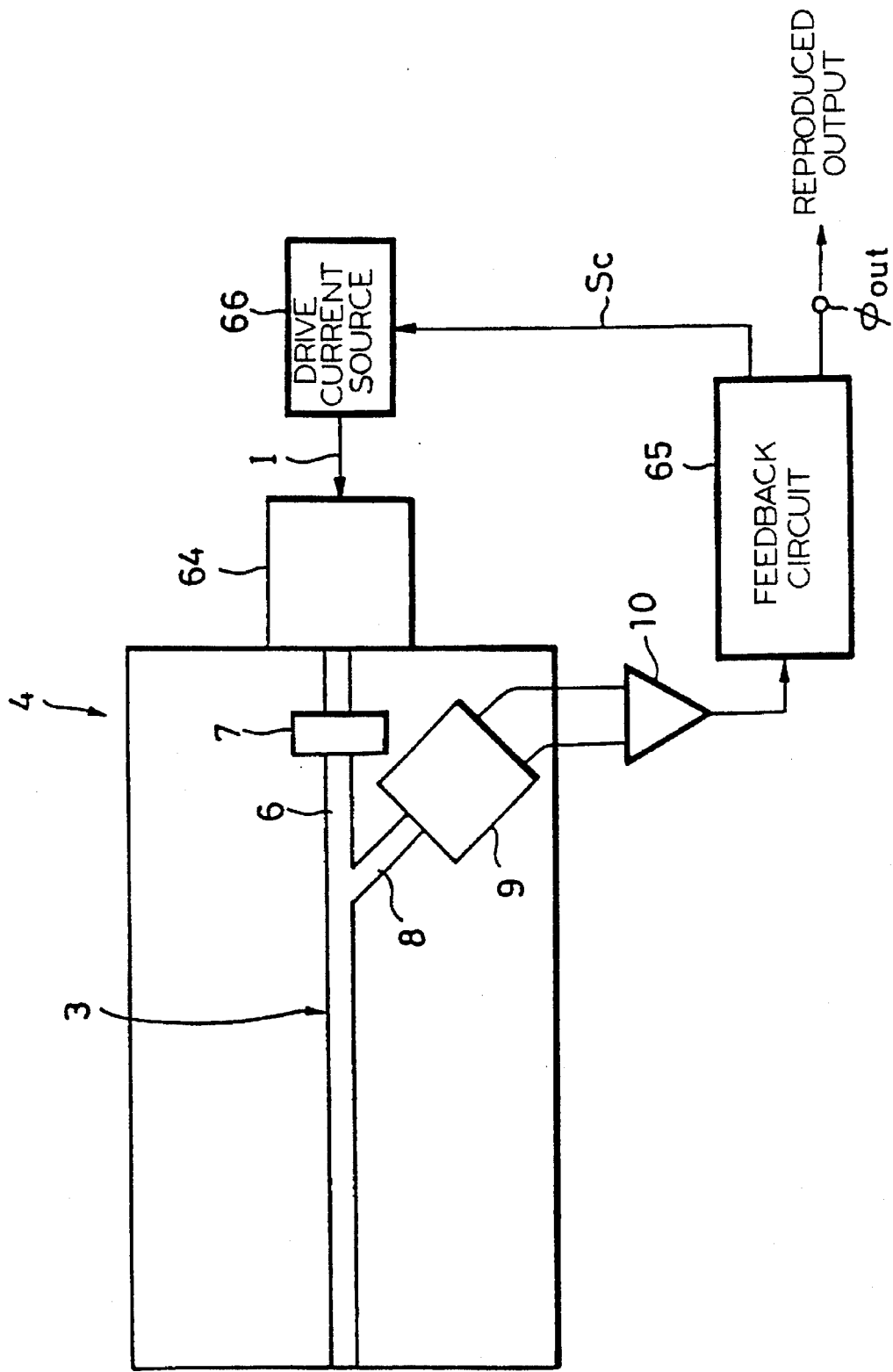
FIG. 15 is a schematic block diagram showing an arrangement of a magneto-optical reproducing pickup according to a third embodiment of the present invention.
Figure 16:
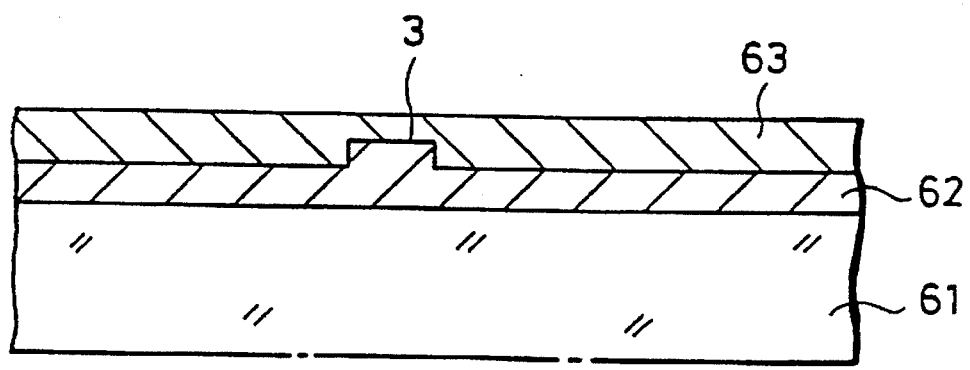
FIG. 16 is a cross-sectional view showing a main portion of the magneto-optical reproducing pickup according to the third embodiment of the present invention.

The feedback circuit 56 is a circuit which compensates a phase by using the error signal Se representing a displacement from the current value I so that the relative values from the current source supply 55 are maximized. As shown in FIG. 14, the fundamental arrangement of the feedback circuit 56 is the same as that of the feedback circuit 11 according to the first embodiment of the present invention and synchronize-detects the output from the differential amplifier 10 by the frequency fm sufficiently higher than the frequency fc of the carrier signal which reads the magneto-optical recording medium to generate the error signal Sc. Then, the feedback circuit 56 feeds the error signal Se back to the current source 55.

Specifically, the modulated signal with the frequency fm is supplied from the oscillator 31 to the current source 55, whereby the output of the differential amplifier 10 is modulated with the frequency fm. Then, after the output of the differential amplifier 10 is supplied to a higher harmonic component with the frequency fm thereof is eliminated by the BPF 33, the resultant signal is multiplied with the modulated signal from the oscillator 31 by the multiplier 34 and then supplied to a second LPF 35 which generates the error signal Se.

The error signal Se is added with the modulated signal from the oscillator 31 by the succeeding adder 36 and supplied to the current source 55 as the control signal Sc. On the other hand, the output from the differential amplifier 10 is supplied to and eliminated in its modulated signal component with the frequency fm by the first LPF 32 and output as a reproduced signal.

As described above, in the magneto-optical reproducing pickup according to the second embodiment, the Ta₂O₅ thin film 52 with light refractive index higher than that of the glass substrate 51 is formed on the optical waveguide 4 and the Peltier element 54 is formed on the optical waveguide 4 through the planar film 53 made of the SiO₂ film. Then, the control signal Sc is supplied to the current source 55 which supplies the current I to the Peltier element 54 to thereby control a part of the temperature of the optical waveguide 4. Thus, the phase difference between the TE mode and the TM mode can be changed.

Accordingly, it is possible to control the phase difference between the TE mode and the TM mode based on the control signal Sc supplied from the feedback circuit 56. Thus, it becomes possible to adjust the phase difference to be a positive integral multiple of $\pi$. As a result, the relative values of the detected signals output from the photo-detecting elements 9a and 9b can be maximized and it is possible to prevent the reproduced signal from being deteriorated by elliptically polarized light.

It is possible to change the range of temperature based on the Peltier element 54 by properly selecting the waveguide length of the optical waveguide and the length of the Peltier element 54 in the longitudinal direction. In this case, it is possible to coarsely adjust the range of temperature by changing the waveguide length of the optical waveguide 4. Also, it is possible to fine adjust the range of temperature by changing the length of the Peltier element 54 in the longitudinal direction. Thus, when the waveguide length of the optical waveguide 4 is changed, the optical waveguide 4 need not be manufactured with accuracy of the order of wavelength, which is practical.

A magneto-optical reproducing pickup according to a third embodiment of the present invention will hereinafter be described with reference to FIGS. 15 to 18. In FIGS. 15 to 18, like parts corresponding to those of FIG. 5 are marked with the same references and therefore need not be described in detail.

The magneto-optical reproducing pickup according to the third embodiment of the present invention has substantially the same arrangement as that of the magneto-optical reproducing pickup according to the first embodiment and is different from the magneto-optical reproducing pickup according to the first embodiment as follows:

Specifically, the substrate is formed of a glass substrate 61 having a height of 0.5 mm and a light refractive index n=1.45; the thin film constructing the waveguide and the convex-shaped line 3 is formed of a TiO$_2$ film 62 having a light refractive index n=2.5; the planar film is formed of an SiO$_2$ film 63 having a light refractive index n4=1.46; the phase control electrode 21 shown in the first embodiment is not formed on the optical waveguide 4; and a wavelength variable semiconductor laser 64 is used as the light source.

As a method for varying a wavelength of the wavelength variable semiconductor laser 64, there are proposed a method for controlling a wavelength by a temperature and drive current and a method using a grating TE-TM mode converter. In this embodiment, it is possible to vary the wavelength by controlling a drive current I from a drive current source 66 by a feedback circuit 65.

Figure 17:
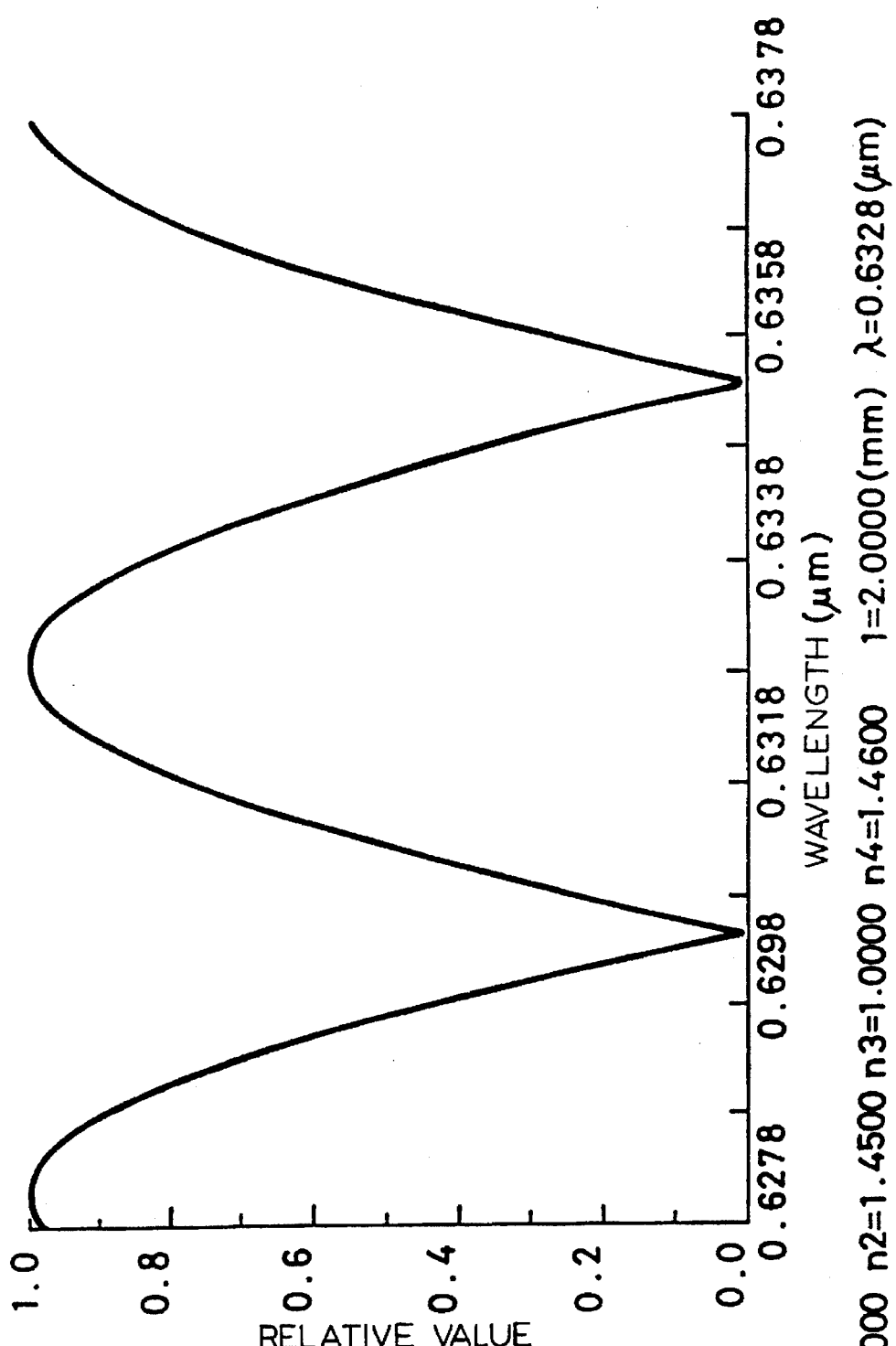
FIG. 17 is a characteristic graph showing measured results of a laser light wavelength dependence in relative values of photo-detected signals from two photo-detecting elements.

Having examined the changes of the relative values of the detected signals output from the respective photo-detecting elements 9a, 9b when the wavelength λ of the wavelength variable semiconductor laser 64 under the condition that the waveguide length is selected to be 2 mm, as shown in FIG. 17, it is to be noted that a wavelength has to be changed by 5 nm in order to vary the phase difference by π and that a wavelength has to be controlled with accuracy of 1 nm or smaller in order to hold the relative values at higher than 90% of the maximum value.

These conditions can be realized by a wavelength varying technique based on the feedback circuit 65. Moreover, these conditions can be shifted depending on the waveguide length.

Figure 18:
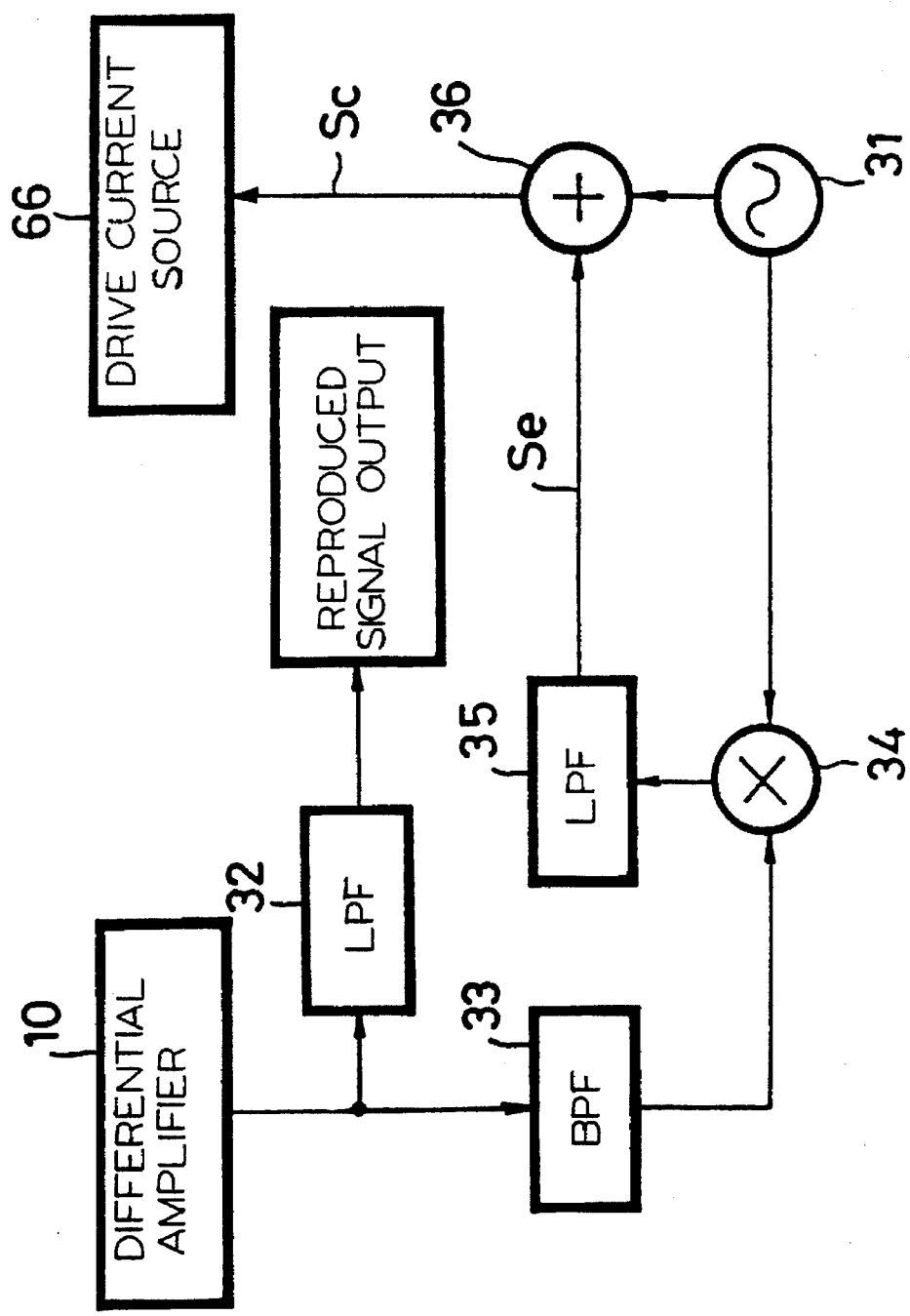
FIG. 18 is a block diagram showing an arrangement of a feedback circuit connected to the magneto-optical reproducing pickup according to the third embodiment of the present invention.

An arrangement of the feedback circuit 65 will be described with reference to FIG. 18. In FIG. 18, like parts corresponding to those of FIG. 9 are marked with the same references. The feedback circuit 65 is connected between the differential amplifier 10 and a drive current source 66 for supplying the drive current I to the wavelength variable semiconductor laser 64. This feedback circuit 65 compensates a phase by using the error signal Se supplied thereto from the drive current source 66 to represent a displacement from the current value I so that the relative values are maximized. The fundamental arrangement of the feedback circuit 65 is substantially the same as those of the first and second embodiments.

Specifically, the feedback circuit 65 synchronize-detects the output of the differential amplifier 10 by the frequency fm sufficiently higher than the frequency fc of the carrier signal read out from the magneto-optical recording medium to output the error signal Se and feeds this error signal Se back to the drive current source 66.

In other words, the modulation signal with the frequency fm is supplied from the oscillator 31 to the drive current source 66, whereby the output of the differential amplifier 10 is modulated with the frequency fm. Then, after the output of the differential amplifier 10 is supplied to and eliminated in higher harmonic component of the frequency fm by the BPF 33, the resultant signal is multiplied by the multiplier 34 with the modulation signal from the oscillator 31 and further supplied to the second LPF 35 which generates the error signal Se.

This error signal Se is added by the succeeding adder 36 with the modulation signal from the oscillator 31 and supplied to the drive current source 66 as the control signal.

On the other hand, the output from the differential amplifier 10 is eliminated in modulation signal component with the frequency fm by the first LPF 32 and then output as a reproduced signal.

As set forth, in the magneto-optical reproducing pickup according to the third embodiment, since the wavelength variable semiconductor laser 64 is used as the light source of the optical waveguide 4 in which the TiO$_2$ thin film 62 with the light refractive index higher than that of the substrate 61 is formed on the substrate and the wavelength of laser light emitted from the wavelength variable semiconductor laser 64 can be varied by supplying the control signal Sc to the drive current source 66 which supplies the drive current I to the wavelength variable semiconductor laser 64, it is possible to change the phase difference between the TE mode and the TM mode.

Therefore, it is possible to control the phase difference between the TE mode and the TM mode based on the control signal Sc supplied from the feedback circuit 65. Thus, it is possible to adjust the phase difference to be a positive integral multiple of π. As a result, the relative values of the detected signals output from the photo-detecting elements 9a, 9b can be maximized and it is possible to prevent the reproduced signal from being deteriorated by elliptically polarized light.

As described above, according to the present invention, since the magneto-optical reproducing pickup includes an optical waveguide for guiding a light component of a first mode of light emitted from the light emitting means to the recording medium side and guiding light reflected on the recording medium to the photo-detector side and the phase compensating means disposed on the optical waveguide for compensating the phase difference between the light components of the first and second modes included on the reflected light, even when the manufacturing of the waveguide is fluctuated, the optical parameter is fluctuated or the wavelength of the emitted light is fluctuated due to the change of temperature, the phase difference between the two intrinsic modes can be compensated (made a positive integral multiple of π) with ease. Thus, it is possible to prevent the reproduced signal from being deteriorated by elliptically polarized light.

According to the present invention, since the phase compensating means comprises the optical waveguide formed by the thin film having the light refractive index higher than that of the substrate formed on the substrate formed of the electro-optic crystal and the electric applying means for applying an electric field to the optical waveguide in the direction along the second mode, it is possible to control the phase difference by properly selecting intensity of electric field generated from the electric field applying means. As a result, it is possible to prevent the reproduced signal from being deteriorated by elliptically polarized light.

According to the present invention, since the phase compensating means comprises the optical waveguide formed by the thin film having the light refractive index higher than that of the substrate formed on the substrate formed of the electro-optic crystal and the electric applying means for applying an electric field to the optical waveguide in the direction along the second mode, it is possible to control the phase difference by properly selecting intensity of electric field generated from the electric field applying means. Thus, it is possible to adjust the phase difference to be a positive integral multiple of π. As a result, it is possible to prevent the reproduced signal from being deteriorated by elliptically polarized light.

Further, according to the present invention, since the phase compensating means is constructed by providing the temperature control element formed on the optical waveguide, it becomes possible to control a temperature of a part of the waveguide by the temperature control element. Thus, the phase difference between the two modes can be controlled. As a result, it is possible to adjust the phase difference to be a positive integral multiple of π. Thus, it is possible to prevent the reproduced signal from being deteriorated by the elliptically polarized light.

Furthermore, according to the present invention, since the phase compensating means includes the wavelength control means for varying a wavelength of light emitted from the light emitting means, a wavelength of the light emitting means can be controlled by the wavelength control means and the phase difference between the two modes can be controlled. As a result, it becomes possible to adjust the phase difference to be the positive integral multiple of π. Thus, it is possible to prevent the reproduced signal from being deteriorated by elliptically polarized light.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A magneto-optical pickup device, comprising:
   a) a substrate;
   b) a light emitting device;
   c) a filter polarizing light emitted by said light emitting device to generate a first polarized component of light;
   d) a differential photo-detecting unit which separates light into first and second polarized components of light;
   e) an optical waveguide operatively configured and disposed on said substrate to guide said first polarized component of light from said filter onto a magneto-optical recording medium, and to guide light reflected back from said medium to said differential photo-detecting unit;
   f) a differential amplifying circuit coupled to an output of said differential photo-detecting unit, said differential amplifying circuit providing an output signal which varies according to a magnetization direction of magnetization information recorded on the magneto-optical recording medium;
   g) a feedback circuit coupled to said differential amplifying circuit, which feedback circuit is configured to generate a phase compensating signal that correlates to a phase difference between said first and second polarized components of light in said light reflected from said magneto-optical recording medium; and
   h) phase compensating means for receiving said phase compensating signal and minimizing said phase difference.

2. A magneto-optical pickup device according to claim 1, wherein said phase compensating means comprises said optical waveguide composed of said substrate formed of an electrooptic crystal and a thin film, formed on said substrate, having a light refractive index higher than that of said substrate and electric field applying means for applying an electric field to said optical waveguide in the direction of said second polarized component of light.

3. A magneto-optical pickup device according to claim 1, wherein said phase compensating means comprises said optical waveguide composed of said substrate and a thin film formed on said substrate and made of an electrooptical crystal and whose light refractive index is higher than that of said substrate and electric field applying means disposed on said optical waveguide for applying an electric field to said optical waveguide in the direction along said second polarized component of light.

4. A magneto-optical pickup device according to claim 1, wherein said phase compensating means includes wavelength control means for varying a wavelength of light emitted from said light emitting device.

5. The magneto-optical pickup device of claim 1, wherein said waveguide comprises a first path that guides said polarized light from said filter to said magneto-optical recording medium and a returning path that branches out from said first path thereby to guide said light reflected from said magneto-optical recording medium to said differential photo-detecting unit.

6. The magneto-optical pickup device of claim 1, wherein said differential photo-detecting unit comprises a split optical waveguide with first and second parallel paths, the first parallel path including a first filter with a polarizing plane with a first angle of inclination, and said second parallel path including a second filter with a polarizing plane with a second angle of inclination opposite of the first angle of inclination.

7. The magneto-optical pickup device of claim 1, 5 or 6, wherein said feedback circuit includes a reproduced signal output at which is generated an electronic output signal reproducing said magnetization information recorded in said magneto-optical medium.

8. The magneto-optical pickup device of claim 1, 5 or 6, wherein said feedback circuit comprises a reproduced signal output at which is generated an output signal reproducing said magnetization information recorded in said magneto-optical medium, and a low-pass filter between said reproduced signal output and said differential amplifying circuit.

9. The magneto-optical pickup device of claim 1, 5 or 6, wherein said feedback circuit comprises means for generating a frequency modulated signal, means coupled to the differential amplifying circuit and said means for generating a frequency modulated signal for generating an error signal, and means for adding said error signal to said frequency modulated signal to generate said phase compensating signal.

10. The magneto-optical pickup device of claim 1, 5 or 6, wherein said feedback circuit comprises a reproduced signal output at which is generated an electronic output signal corresponding to said magnetization information recorded on said magneto-optical recording medium and a first low pass filter coupled between said reproduced signal output and said differential amplifying circuit, a frequency modulator which generates a frequency modulated signal, a band pass filter coupled to said differential amplifying circuit whose center frequency is the same as that of said frequency modulated signal, a multiplier unit coupled to an output of said bandpass filter and an output of said frequency modulator, a second low pass filter operatively connected to an output of said multiplier unit to generate a phase difference signal and an adder unit coupled to said output of said frequency modulator and to said phase difference signal to generate said phase compensating signal.

11. The magneto-optical pickup device of claim 1, 5 or 6, wherein said means for receiving said phase compensating signal and minimizing said phase difference comprises an electrode unit operatively positioned about said waveguide to effect a change in a refraction width in said waveguide when an electrical signal is applied thereto.

12. The magneto-optical pickup device of claim 11, wherein said substrate is an electro-optical crystal substrate.

13. The magneto-optical pickup device of claim 12, wherein said substrate is made of KTP.

14. The magneto-optical pickup device of claim 12, wherein said substrate is made of silicon.

15. The magneto-optical pickup device of claim 1, 5 or 6, wherein said phase compensating means comprises means for varying the wavelength of the light emitted by said light emitting device.

16. The magneto-optical pickup device of claim 15, wherein the substrate is a glass substrate.

17. The magneto-optical pickup device of claim 1, 5 or 6, wherein said phase compensating means comprises a temperature control element operatively disposed on said waveguide to control a temperature of said waveguide.

18. The magneto-optical pickup device of claim 17, wherein said substrate is a glass substrate.

19. The magneto-optical pickup device of claim 17, wherein said temperature control element is a Peltier element.

20. A magneto-optical reproducing pickup comprising:

light emitting means;

an optical waveguide guiding a first mode light component of light emitted from said light emitting means to a recording medium and guiding light reflected from said recording medium to a photo-detector; and phase compensating means for compensating a phase difference between light components of said first mode and of a second mode said phase compensating means including a temperature control element formed on said optical waveguide.

21. A magneto-optical pickup device comprising:

a) a substrate;

b) a light emitting device;

c) a filter polarizing light emitted by said light emitting device to generate a first polarized component of light;

d) a differential photo-detecting unit which separates light into first and second polarized component of light;

e) an optical waveguide operatively configured and disposed on said substrate to guide said first polarized component of light from said filter onto a magneto-optical recording medium, and to guide light reflected back from said medium to said differential photo-detecting unit, wherein said waveguide comprising a first path that guides said polarized light from said filter to said magneto-optical recording medium and a returning path that branches out from said first path thereby to guide said light reflected from said magneto-optical recording medium to said differential photo-detecting unit;

f) a differential amplifying circuit coupled to an output of said differential photo-detecting unit, said differential amplifying circuit providing an output signal which varies according to a magnetization direction of magnetization information recorded on the magneto-optical recording medium;

g) a feedback circuit coupled to said differential amplifying circuit, which feedback circuit is configured to generate a phase compensating signal that correlates to a phase difference between said first and second polarized components of light in said light reflected from said magneto-optical recording medium; and h) phase compensating means for receiving said phase compensating signal and minimizing said phase difference, wherein said means for receiving said phase compensating signal and minimizing said phase difference comprises an electrode unit operatively positioned about said waveguide to effect a change in a refraction width in said waveguide when an electrical signal is applied thereto.

22. A magneto-optical pickup device, comprising:

a) a substrate;

b) a light emitting device;

c) a filter polarizing light emitted by said light emitting device to generate a first polarized component of light;

d) a differential photo-detecting unit which separates light into first and second polarized components of light;

e) an optical waveguide operatively configured and disposed on said substrate to guide said first polarized component of light from said filter onto a magneto-optical recording medium, and to guide light reflected back from said medium to said differential photo-detecting unit, wherein said waveguide comprising a first path that guides said polarized light from said filter to said magneto-optical recording medium and a returning path that branches out from said first path thereby to guide said light reflected from said magneto-optical recording medium to said differential photo-detecting unit;

f) differential amplifying circuit coupled to an output of said differential photo-detecting unit, said differential amplifying circuit providing an output signal which varies according to a magnetization direction of magnetization information recorded on the magneto-optical recording medium;

g) a feedback circuit coupled to said differential amplifying circuit, which feedback circuit is configured to generate a phase compensating signal that correlates to a phase difference between said first and second polarized components of light in said light reflected from said magneto-optical recording medium; and h) phase compensating means for receiving said phase compensating signal and minimizing said phase difference, wherein said phase compensating means comprises means for varying the wavelength of the light emitted by said light emitting device.

23. A magneto-optical pickup device comprising:

a) a substrate;

b) a light emitting device;

c) a filter polarizing light emitted by said light emitting device to generate a first polarized component of light;

d) a differential photo-detecting unit which separates light into first and second polarized components of light;

e) an optical waveguide operatively configured and disposed on said substrate to guide said first polarized component of light from said filter onto a magneto-optical recording medium, and to guide light reflected back from said medium to said differential photo-detecting unit, wherein said waveguide comprising a first path that guides said polarized light from said filter to said magneto-optical recording medium and a returning path that branches out from said first path thereby to guide said light reflected from said magneto-optical recording medium to said differential photo-detecting unit;

f) a differential amplifying circuit coupled to an output of said differential photo-detecting unit, said differential amplifying circuit providing an output signal which varies according to a magnetization direction of magnetization information recorded on the magneto-optical recording medium;

g) a feedback circuit coupled to said differential amplifying circuit, which feedback circuit is configured to generate a phase compensating signal that correlates to a phase difference between said first and second polarized components of light in said light reflected from said magneto-optical recording medium; and h) phase compensating means for receiving said phase compensating signal and minimizing said phase difference, wherein said phase compensating means comprises a temperature control element operatively disposed on said waveguide to control a temperature of said waveguide.

* * * * *